United States Patent
Koide et al.

(10) Patent No.: US 7,416,149 B2
(45) Date of Patent: Aug. 26, 2008

(54) WEBBING TAKE-UP DEVICE

(75) Inventors: Teruhiko Koide, Aichi (JP); Masayoshi Nojiri, Aichi (JP); Koji Muto, Aichi (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 377 days.

(21) Appl. No.: 11/191,953

(22) Filed: Jul. 29, 2005

(65) Prior Publication Data

US 2006/0022079 A1    Feb. 2, 2006

(30) Foreign Application Priority Data

Jul. 30, 2004    (JP)    ............... 2004-224108

(51) Int. Cl.
*B60R 22/46*    (2006.01)
(52) U.S. Cl. .................... 242/374; 242/390.8
(58) Field of Classification Search ................ 242/374, 242/390, 390.1, 390.8, 390.9, 534.2, 563.2; 280/807; 297/475, 476, 477, 478
See application file for complete search history.

(56) References Cited

U.S. PATENT DOCUMENTS

| | | | | |
|---|---|---|---|---|
| 4,666,097 A | * | 5/1987 | Tsuge et al. ............. | 242/390.1 |
| 4,669,680 A | * | 6/1987 | Nishimura et al. ....... | 242/375.3 |
| 4,787,569 A | * | 11/1988 | Kanada et al. ............ | 242/371 |
| 6,427,935 B1 | * | 8/2002 | Fujii et al. ............... | 242/390.9 |
| 6,494,395 B1 | * | 12/2002 | Fujii et al. ............... | 242/374 |
| 6,575,394 B1 | * | 6/2003 | Fujita et al. ............. | 242/390.8 |

FOREIGN PATENT DOCUMENTS

JP    11-227567    8/1999

\* cited by examiner

*Primary Examiner*—Peter M. Cuomo
*Assistant Examiner*—Scott Haugland
(74) *Attorney, Agent, or Firm*—Roberts Mlotkowski Safran & Cole, P.C.; Thomas W. Cole

(57) ABSTRACT

In a webbing take-up device, when the release of a webbing belt is detected from the signal of a buckle switch, a motor starts driving, the webbing belt is taken up, and a computing circuit increases a voltage Eb in accordance with an integrated time after the signal is switched. In this state, a lock current flows due to an output shaft of the motor being stopped, and when the power to the motor is cut off by increasing the lock current, the values of voltages El and Ed respectively corresponding to the integrated time in which the lock current is powered and the integrated time in which the power to the motor is cut off are subtracted from the value of the voltage Eb, and the motor is driven until the computing result reaches a predetermined value.

14 Claims, 4 Drawing Sheets

F I G. 4
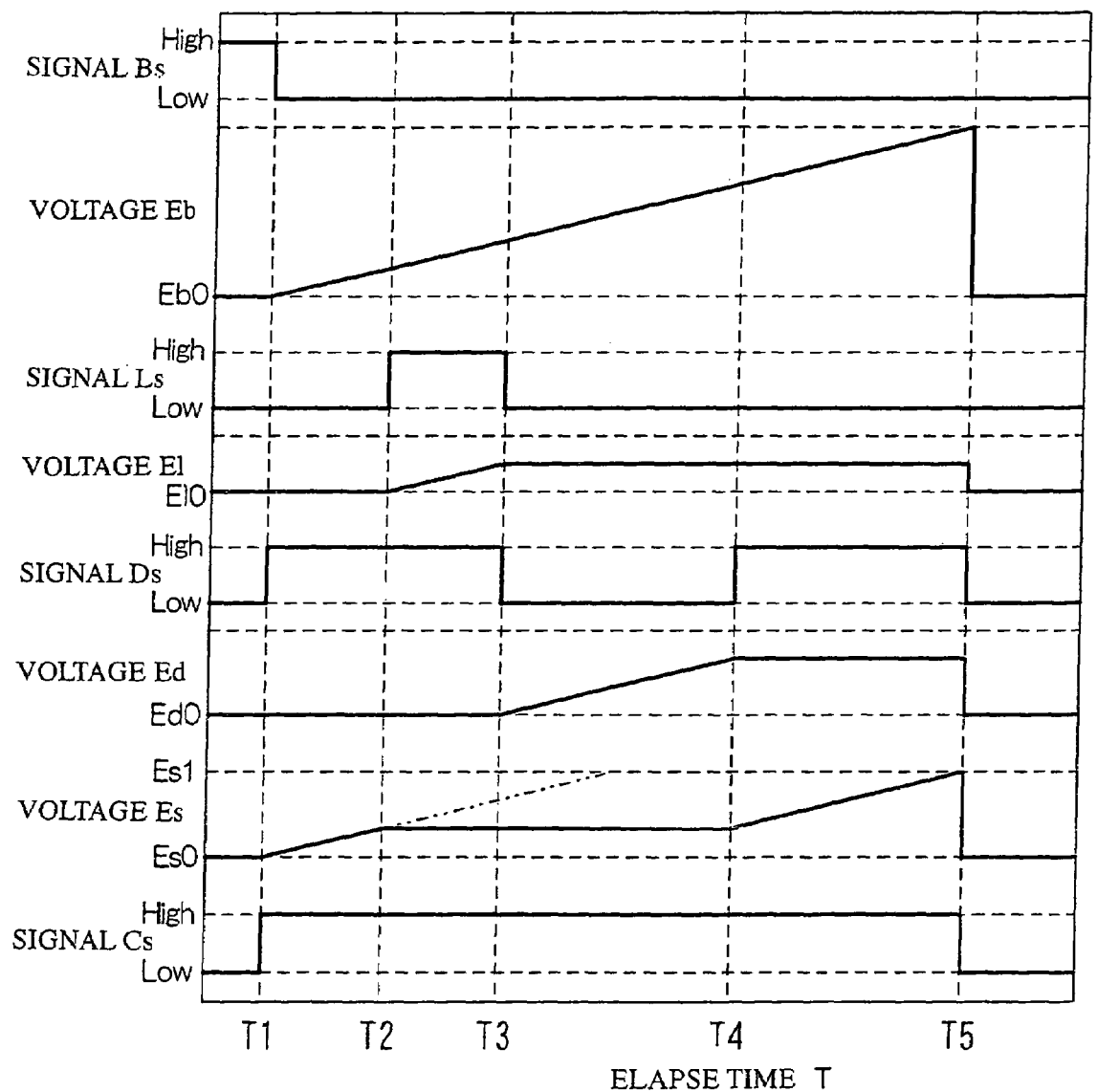

WEBBING TAKE-UP DEVICE

CROSS-REFERENCE TO RELATED APPLICATION

This application claims priority under 35 USC 119 from Japanese Patent Application No. 2004-224108, the disclosure of which is incorporated by reference herein.

BACKGROUND OF THE INVENTION

1. Field of the Invention

The present invention relates to a webbing take-up device that configures a seat belt for restraining, with a long band-like webbing belt, the body of a vehicle occupant seated in a seat of a vehicle.

2. Description of the Related Art

Seat belt devices that restrain, with a long band-like webbing belt, the body of a vehicle occupant seated in a seat of a vehicle, are disposed with a webbing take-up device fixed to the vehicle body at the side of the seat. The webbing take-up device is disposed with a spool (take-up shaft) whose axial direction is along the substantial front-rear direction of the vehicle, for example. A longitudinal-direction base end side of the webbing belt is attached to the spool.

The webbing belt is taken up and accommodated on the spool from the longitudinal-direction base end side of the webbing belt. When the webbing belt is placed around the body of the vehicle occupant, the webbing belt is pulled towards the leading end side, and the webbing belt accommodated in the taken-up state on the spool is pulled out.

Next, the pulled-out webbing belt is placed around the body of the vehicle occupant. Then, a tongue plate disposed at a longitudinal-direction intermediate portion of the webbing belt is inserted into a buckle device disposed opposite from the webbing take-up device via the seat.

Thus, the tongue plate is retained in the buckle device, and the state in which the webbing belt is placed around the body of the vehicle occupant is retained.

A spiral spring is directly or indirectly coupled to one axial-direction end of the spool. When the webbing belt taken up on the spool is pulled out as described above, the spool rotates in a pullout direction, which is one direction around its axis. When the spool rotates in the pullout direction in this manner, the spiral spring is tightened and urges the spool in the take-up direction.

In the state where the webbing belt is placed around the body of the vehicle occupant, the urging force of the spiral spring causes the slack part of the webbing belt to be taken up on the spool, and causes the webbing belt to be fitted to the body of the vehicle occupant. Then, when the tongue plate is removed from the buckle device, the urging force of the spiral spring causes the spool to rotate in the take-up direction opposite from the pullout direction, and causes the webbing belt to be taken up and accommodated on the spool.

There is also a webbing take-up device having a configuration where the spool is caused to rotate in the take-up direction by the drive force of a motor. An example thereof is disclosed in Japanese Patent Application Laid-Open Publication (JP-A) No. 11-227567.

In the webbing take-up device disclosed in JP-A No. 11-227567, control device for driving/controlling the motor is connected to detecting means (called a "buckle connection detector" in the above publication) such as a buckle switch disposed in the buckle device. When the detecting means detects that the tongue plate has been removed from the buckle device, the control device drives the motor.

In the configuration where the webbing belt is taken up by the drive force of a motor in this manner, the spiral spring becomes unnecessary, or, if a spiral spring is concomitantly used, the spring constant of the spiral spring can be reduced. Because the urging force of the spiral spring increases as the spiral spring is tightened, there is also the potential for the tension of the webbing belt corresponding to the urging force of the spiral spring to impart a feeling of tightness to the vehicle occupant when the webbing belt is placed around the body of the vehicle occupant.

In the configuration where the webbing belt is taken up by the drive force of a motor as described above, the feeling of tightness that the vehicle occupant experiences when the webbing belt is placed around the body of the vehicle occupant can be eliminated or reduced by eliminating the spiral spring or reducing the spring constant of the spiral spring.

Incidentally, in the case of the configuration where the spool is rotated in the take-up direction by the drive force of a motor and the webbing belt is taken up and accommodated on the spool in this manner, the necessary take-up time is set as the drive time of the motor necessary until the entire webbing belt is accommodated from the state in which the entire webbing belt has been pulled out, and after the tongue plate is removed from the buckle device as described above, the control device of the motor drives the motor only for the necessary take-up time.

Here, for example, in a state where the webbing belt is removed from the body of the vehicle occupant, sometimes the tongue plate and/or part of the webbing belt becomes caught between the door panel and the peripheral edge of the door opening that the door panel opens and closes, or else the webbing belt catches on part of the seat, so that it becomes impossible for the webbing belt to be taken up by only the rotational force of the spool in the take-up direction.

However, the motor continues to be driven even when it is impossible for the webbing belt to be taken up. Thus, even if the vehicle occupant were to become aware of the fact that it is impossible for the webbing belt to be taken up and eliminate this problem, the motor ends up being stopped when the necessary take-up time elapses after the start of the driving of the motor. For this reason, the webbing belt is not completely accommodated on the spool (so-called "totally accommodated state"), and its appearance is poor.

SUMMARY OF THE INVENTION

In view of these facts, it is an object of the present invention to obtain a webbing take-up device that can reliably take up and accommodate a preset predetermined amount of the webbing belt by eliminating the state where it is impossible for the webbing belt to be taken up, even if such a state temporarily arises.

A first aspect of the invention provides a webbing take-up device including: a spool to which a longitudinal-direction base end side of a long band-like webbing belt is attached, with the spool rotating in a take-up direction in regard to its axis, to thereby take up the webbing belt from the base end side around an outer peripheral portion of the spool; drive means that is disposed with an output shaft, which causes the output shaft to rotate by outputting a drive force, transmits the rotation of the output shaft to the spool, and causes the spool to rotate in the take-up direction; computing means that integrates a take-up time after the drive force is outputted, integrates a stop time in which the rotation of the output shaft is stopped while integrating the take-up time, and computes the difference between the integrated take-up time and the integrated stop time; and control means that actuates the drive means in accompaniment with the release of a fastened state of the webbing belt with respect to the body of a vehicle occupant, and causes the drive means to stop on the basis of the fact that the difference between the integrated take-up time and the integrated stop time computed by the computing means has reached a predetermined time.

In the webbing take-up device pertaining to the first aspect of the invention, the webbing belt taken up and accommodated on the spool is pulled out and placed around the body of a vehicle occupant. A tongue plate disposed on the webbing belt, for example, is retained in a buckle device disposed in the vicinity of the seat of the vehicle, whereby the webbing belt is fastened around the body of the vehicle occupant.

When this fastened state is released, the control means actuates the drive means. When the drive means is actuated and a drive force is actuated from the drive means, the output shaft rotates, the rotational force of the output shaft is transmitted to the spool, and the spool rotates in the take-up direction. When the spool rotates in the take-up direction, the webbing belt is taken up in layers on the outer peripheral portion of the spool from the base end side. Thus, the webbing belt is accommodated on the spool.

When the drive means begins outputting the drive force as described above, the integration of the integrated take-up time after the drive means begins outputting the drive force is started by the computing means.

When part of the webbing belt and/or the tongue plate becomes caught between the closed door panel and the peripheral edge of the door opening after the drive means outputs the drive force, for example, the leading end side of the webbing belt in front of the portion caught between door panel and the peripheral edge of the door opening does not move towards the spool and is not taken up on the spool even if the spool rotates in the take-up direction.

In this manner, a constant tension acts between the spool and the portion of the webbing belt caught between the door panel and the peripheral edge of the door opening, so that when the rotation of the spool in the take-up direction is obstructed, the rotation of the output shaft of the drive means is stopped. When the rotation of the output shaft is stopped in this manner, the integrated stop time after the rotation of the output shaft stops is computed by the computing means. Moreover, the difference between the integrated take-up time and the integrated stop time is calculated by the computing means.

Next, when the webbing belt and/or the tongue plate is removed from between the door panel and the peripheral edge of the door opening, the external force obstructing the rotation of the spool in the take-up direction is eliminated, and the spool is again rotated in the take-up direction by the drive force of the drive means.

Thus, the spool resumes taking up the webbing belt. The fact that the spool is being rotated in the take-up direction by the drive force of the drive means indicates that the output shaft is rotating. Thus, the integration of the integrated stop time is stopped.

When the computing result of the difference between the integrated take-up time and the integrated stop time in the computing means reaches a predetermined time, the control means determines that the webbing belt of a length where it is totally accommodated has been taken up on the spool, and cuts off the power to the drive means.

Here, in the webbing take-up device pertaining to the first aspect of the invention, the integrated stop time is subtracted from the integrated take-up time. Thus, the time in which the output shaft is substantially rotating after the drive means starts driving can be computed. For this reason, in the webbing take-up device pertaining to the invention, the drive means can be made to drive until the webbing belt is taken up on the spool of a constant amount.

In the webbing take-up device pertaining to the first aspect of the invention, the integrated stop time may include a lock current power time that is a time in which a lock current is flowing to the drive means and a power cutoff time that is a time in which the power to the drive means is cut off.

In this case, if the rotation of the spool in the take-up direction is obstructed and the rotation of the output shaft is stopped after the drive means starts driving, a lock current larger than the ordinary drive current flows to the drive means. The lock current power time, which is the time in which the lock current is flowing, is integrated as the integrated stop time in the computing means.

When the power to the drive means is cut off as a result of the lock current flowing in this manner, the power cutoff time, which is the time in which the power is cut off, is computed as the integrated stop time in the computing means.

Namely, in this configuration, the integrated take-up time and the integrated stop time can be computed by detecting the status of the power of the drive means. For this reason, a special configuration for detecting the status of rotation of the output shaft (e.g., a rotary encoder) becomes unnecessary. Thus, the overall configuration can be simplified, which contributes to making the device more compact and lightweight.

A second aspect of the invention provides a webbing take-up device including: a spool including a peripheral surface that takes up a webbing belt; a drive motor that drives the spool, via a transmission mechanism, in a direction in which the spool takes up the webbing belt; a computing unit that integrates a take-up time after the drive of the drive motor is started, integrates a stop time in which the rotation of the output shaft is stopped while integrating the take-up time, and computes the difference between the integrated take-up time and the integrated stop time; and a control unit that starts the drive of the drive motor in response to the release of a fastened state of the webbing belt to the body of a vehicle occupant, and causes the drive motor to stop when the difference between the integrated take-up time and the integrated stop time computed by the computing means reaches a predetermined time.

A third aspect of the invention provides a webbing take-up device including: a spool including a peripheral surface that takes up a webbing belt; a drive motor that rotates the spool, via a transmission mechanism, in a direction in which the spool takes up the webbing belt; and a control unit that controls the drive time of the motor, wherein the control unit starts the drive of the drive motor in response to the release of the fastening of the webbing belt to a vehicle occupant, and terminates the taking up when a net take-up time in which the spool is taking up the webbing belt reaches a predetermined time.

As described above, in the webbing take-up device pertaining to the invention, a preset predetermined amount of the webbing belt can be reliably taken up and accommodated by eliminating the state where it is impossible for the webbing belt to be taken up, even if such a state temporarily arises.

BRIEF DESCRIPTION OF THE DRAWINGS

FIG. 4 is a time chart showing the state of various signals and outputs of timer units and a computing unit.

DETAILED DESCRIPTION OF THE INVENTION

Configuration of the Embodiment

Figure 1:
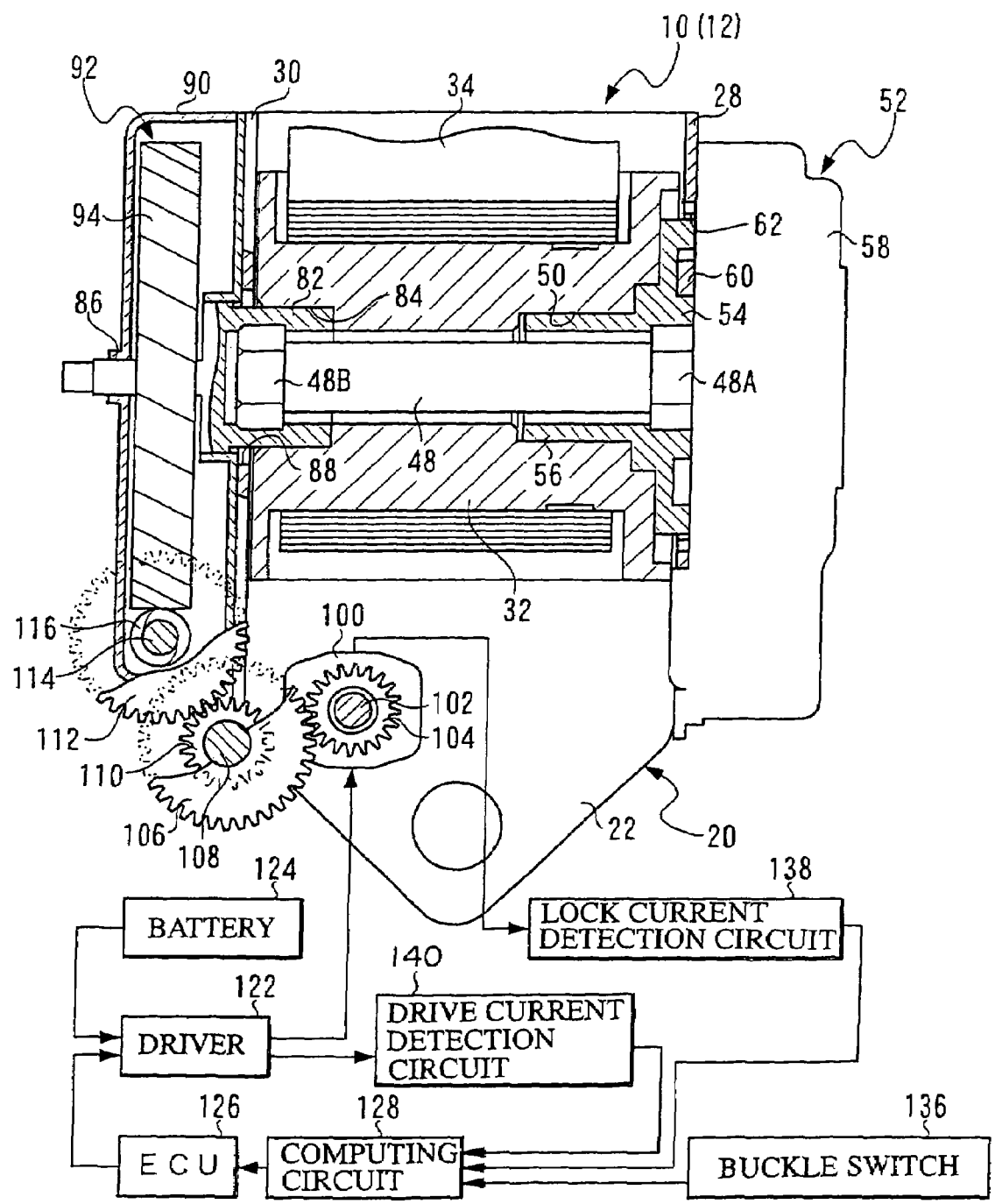
FIG. 1 is a front sectional view showing the configuration of a webbing take-up device pertaining to an embodiment of the invention.
Figure 2:
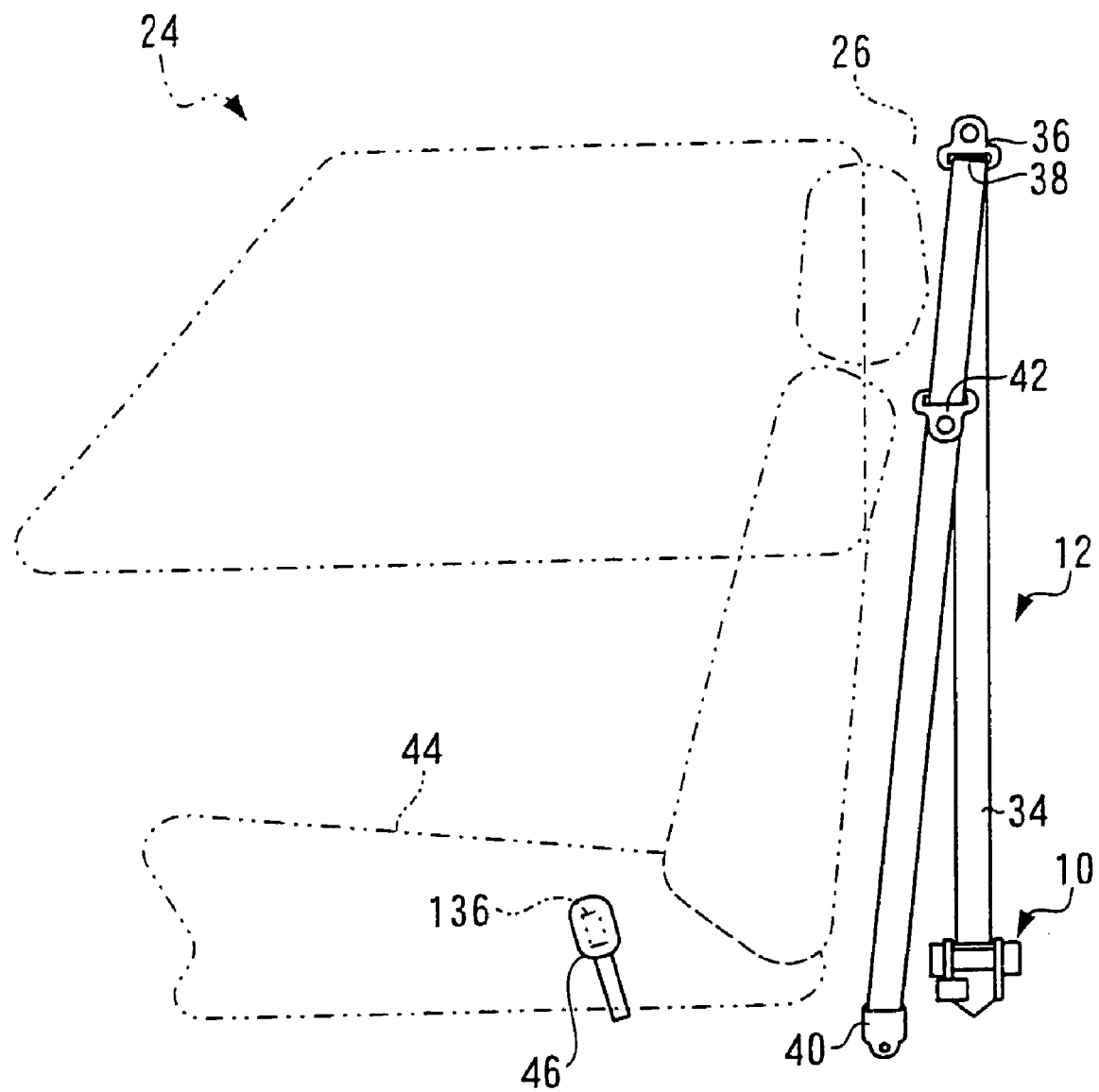
FIG. 2 is a side view showing the schematic configuration of a seat belt device to which the webbing take-up device pertaining to the embodiment of the invention has been applied.

FIG. 1 is a front sectional view showing the overall schematic configuration of a webbing take-up device 10 pertaining to an embodiment of the invention, and FIG. 2 is a side view showing the schematic configuration of a seat belt device 12 to which the webbing take-up device 10 has been applied.

As shown in FIG. 1, the webbing take-up device 10 is disposed with a frame 20. The frame 20 is disposed with a tabular back plate 22. The back plate 22 is fixed, by unillustrated fixing means such as a bolt, to a vehicle body in the vicinity of a lower end portion of a center pillar 26 (see FIG. 2) of a vehicle 24. Thus, the webbing take-up device 10 is attached to the vehicle body.

A pair of leg plates 28 and 30 that face each other in the substantial front-rear direction of the vehicle 24 extend parallel to each other from both width-direction ends of the back plate 22.

A spool 32 is disposed so that its axial direction coincides with the direction in which the leg plates 28 and 30 face each other. The spool 32 is configured to be rotatable around its axis. A longitudinal-direction base end portion of a long band-like webbing belt 34 is attached to the spool 32.

The spool 32 rotates in a take-up direction, which is one direction around its axis, whereby the webbing belt 34 is taken up, from the base end side, and accommodated in layers on the outer peripheral portion of the spool 32. By pulling the webbing belt 34 from the leading end side, the webbing belt 34 taken up on the spool 32 is pulled out, and the spool 32 rotates in a pullout direction opposite from the take-up direction in accompaniment therewith.

As shown in FIG. 2, when the webbing take-up device 10 pertaining to the present embodiment is applied to a driver's seat or a passenger seat of the vehicle 24, the webbing belt 34 is pulled out in the substantially upward direction of the vehicle along the center pillar 26 of the vehicle 24. A shoulder anchor 36 that configures the seat belt device 12 together with the webbing take-up device 10 is attached to the vehicle body in the vicinity of an upper end portion of the center pillar 26. A slit hole 38, which is large enough for the webbing belt 34 to pass therethrough, is formed in the shoulder anchor 36. The webbing belt 34 pulled out from the spool 32 passes through the slit hole 38 and is folded in the substantially downward direction of the vehicle.

As shown in FIG. 2, an anchor plate 40 is attached to the vehicle body in the vicinity of the webbing take-up device 10. The leading end portion of the webbing belt 34 is attached to the anchor plate 40.

A tongue plate 42 is disposed, so as to be movable in a predetermined range along the webbing belt 34, between the leading end portion of the webbing belt 34 attached to the anchor plate 40 and the portion of the webbing belt 34 folded at the shoulder anchor 36. A buckle device 46 is disposed opposite from the webbing take-up device 10 and the anchor plate 40 via a seat 44 of the vehicle 24.

The buckle device 46 is disposed so that a leading end side of the tongue plate 42 is insertable into the buckle device 46. When the tongue plate 42 is inserted into the buckle device 46, a latch (not shown) disposed inside the buckle device 46 engages with the tongue plate 42 and regulates the movement of the tongue plate 42 in the direction in which the tongue plate 42 comes out of the buckle device 46.

As shown in FIG. 1, a torsion shaft 48 is disposed coaxially with the spool 32 inside the spool 32. A fitting hole 50 is formed in an end portion of the spool 32 at the leg plate 28 side along the axial direction of the spool 32. The fitting hole 50 is substantially circular and substantially coaxial with the spool 32, and has a stepped shape whose inner diameter dimension becomes larger in steps towards one end side in the axial direction.

A lock mechanism 52 is disposed at one axial-direction end side of the spool 32. The lock mechanism 52 is disposed with a lock base 54. The lock base 54 is disposed with a fitting portion 56.

The fitting portion 56 is formed in a substantially circular cylindrical shape whose outer dimension becomes smaller in steps towards the other axial-direction end side (leg plate 30 side) of the spool 32 in correspondence to the inner peripheral shape of the fitting hole 50. The fitting portion 56 is fitted into the fitting hole 50 so as to be coaxially relatively rotatable with respect to the spool 32 inside the fitting hole 50, and an end portion 48A of the torsion shaft 48 at the leg plate 28 side is coaxially and integrally coupled to the fitting portion 56.

The lock mechanism 52 is also disposed with a case 58. The case 58 is disposed at the outer side of the leg plate 28 (i.e., at the side opposite from the side facing the leg plate 30) and is integrally fixed to the leg plate 28 with fixing means such as a screw or fitting means such as a fitting pawl. Unillustrated members that configure the lock mechanism 52, such as a ratchet gear and a compression coil spring, and a spiral spring that directly or indirectly urges the lock base 54 in the take-up direction are housed inside the case 58.

The ratchet gear inside the case 58 is axially supported by the lock base 54 so as to be coaxially and relatively rotatable with respect to the spool 32 and the lock base 54. One end of the compression coil spring inside the case 58 is attached to the ratchet gear, and the other end of the compression coil spring is attached to the lock base 54.

When the lock base 54 rotates and the compression coil spring is compressed or pulled so that the urging force of the compression coil spring increases, the compression coil spring urges, with its urging force, the ratchet gear in the rotational direction of the lock base 54 and causes the ratchet gear to follow the rotation of the lock base 54.

A lock plate 60 attached to the lock base 54 is engaged with the ratchet gear. When the ratchet gear is unable to follow the lock base 54 about to rotate in the pullout direction (i.e., when the ratchet gear rotates in the take-up direction relative to the lock base 54), the lock plate 60 is induced by the ratchet gear to move outward in the turning radius direction of the spool 32 and mesh with ratchet teeth 62 of inner teeth formed in the leg plate 28. Thus, the rotation of the lock base 54, and therefore the spool 32, in the pullout direction is regulated.

An unillustrated acceleration sensor for the lock mechanism 52 is disposed below the ratchet gear in the radial direction of the ratchet gear. The acceleration sensor is configured to include an engagement pawl that can move into contact with and move away from the ratchet gear, a steel ball disposed at the side of the engagement pawl opposite from the ratchet gear, and a substantially plate-like platform on which the steel ball is placed.

The acceleration sensor for the lock mechanism 52 regulates the rotation of the ratchet gear so that when the steel ball rolls on the platform in a state where the vehicle 24 undergoes a sudden deceleration, the steel ball pushes up the engagement pawl and causes the engagement pawl to approach and engage with the ratchet gear.

As described above, the ratchet gear is rotated following the lock base 54 by the urging force of the compression coil spring, and when the rotation of the ratchet gear is regulated as a result of the engagement pawl of the acceleration sensor meshing with the ratchet gear, relative rotation occurs between the ratchet gear and the lock base 54. Thus, as described above, the lock plate 60 meshes with the ratchet teeth 62.

A sleeve 82 is disposed at an end portion 48B of the torsion shaft 48 at the leg plate 30 side. The sleeve 82 is formed in a bottomed cylinder shape opening towards the leg plate 28 side, and the end portion 48B of the torsion shaft 48 enters the inside of the sleeve 82, whereby the torsion shaft 48 and the sleeve 82 are coaxially and integrally coupled together.

A circular hole 84 is formed in the spool 32 in correspondence to the sleeve 82. The sleeve 82 is fitted and inserted into the circular hole 84, whereby the sleeve 82 is coaxially and integrally coupled to the spool 32.

A shaft portion 86 extends coaxially with respect to the torsion shaft 48 and the spool 32 from an end surface of the sleeve 82 opposite from the torsion shaft 48. The shaft portion 86 penetrates the circular hole 88 formed in the leg plate 30 and protrudes to the outside of the leg plate 30.

A clutch frame 90 is integrally attached, by fixing means such as a screw or fixing means such as a fitting pawl, to the leg plate 30 at the outer side of the leg plate 30. A clutch 92 is housed inside the clutch frame 90. The clutch 92 is disposed with a ring-like worm wheel 94. The worm wheel 94 is disposed coaxially with respect to the shaft portion 86.

One to several pawls is disposed inside the worm wheel 94. The pawl is mechanically coupled to the worm wheel 94 at a position offset from the rotational center of the worm wheel 94, and rotates together with the worm wheel 94 around the shaft portion 86. The pawl is configured to be rotatable with respect to the worm wheel 94 around an axis parallel to the shaft portion 86 at the portion where the pawl is coupled to the worm wheel 94.

An unillustrated adapter is disposed at the axial center portion of the worm wheel 94. The adapter is coaxially and integrally coupled to the shaft portion 86, and rotates integrally with the shaft portion 86, and therefore the spool 32.

Ratchet teeth are formed at the outer peripheral portion of the adapter, and when the pawl rotates, the leading end of the pawl meshes with the ratchet teeth at the outer peripheral portion of the adapter. In this engaged state, the worm wheel 94 is mechanically coupled to the shaft portion 86 via the pawl and the adapter, the rotation of the worm wheel 94 in the take-up direction is transmitted to the shaft portion 86 via the pawl and the adapter, and the shaft portion 86 is caused to rotate in the take-up direction.

As shown in FIG. 1, a motor 100 serving as drive means is disposed below the spool 32. The frame 20 is disposed with the back plate 22 and the leg plates 28 and 30 that extend in both directions at both side portions of the back plate 22, an output shaft 102 of the motor is disposed so as to be positioned at the side of the back plate 22 in which the leg plates 28 and 30 extend, and the leading end side of the output shaft 102 enters an unillustrated gear case.

A spur gear 104 is housed inside the gear case. The gear 104 is coaxially and integrally attached to the output shaft 102. A spur gear 106 with a sufficiently larger number of teeth than that of the gear 104 is disposed at the turning radius direction side of the gear 104 inside the gear case.

The gear 106 is disposed so that its rotary shaft 108 is in the same direction as that of the gear 104, and the gear 106 meshes with the gear 104. A spur gear 110 with a sufficiently less number of teeth than that of the gear 106 is formed coaxially and integrally with the gear 106.

A spur gear 112 with a sufficiently larger number of teeth than that of the gear 110 is disposed at the turning radius direction side of the gear 110 inside the gear case.

The gear 112 is disposed so that its rotary shaft 114 is in the same direction as those of the gears 104 to 110, and the gear 112 meshes with the gear 110. The rotary shaft 114 of the gear 112 protrudes from the gear case and enters the inside of the clutch frame 90. Inside the clutch frame 90, a worm gear 116 is coaxially and integrally disposed with respect to the rotary shaft 114. The worm gear 116 meshes with the worm wheel 94, and the rotation of the output shaft 102 of the motor 100 is transmitted to the worm gear 116 via the gears 104 to 112. When the worm gear 116 rotates, the rotation of the worm gear 116 is transmitted to the worm wheel 94, and the worm wheel 94 rotates.

The motor 100 is electrically connected to a battery 124 via a driver 122. The motor 100 is powered via the driver 122, whereby the motor 100 is driven and causes the output shaft 102 to rotate. The driver 122 is electrically connected to an ECU 126 serving as control means. When a high-level drive control signal Cs (the drive control signal Cs will be simply called a "signal Cs" below) from the ECU 126 is inputted to the driver 122, electrical power is supplied to the motor, and when a low-level signal Cs from the ECU 126 is inputted to the driver 122, the supply of electrical power is stopped (cut off).

Figure 3:
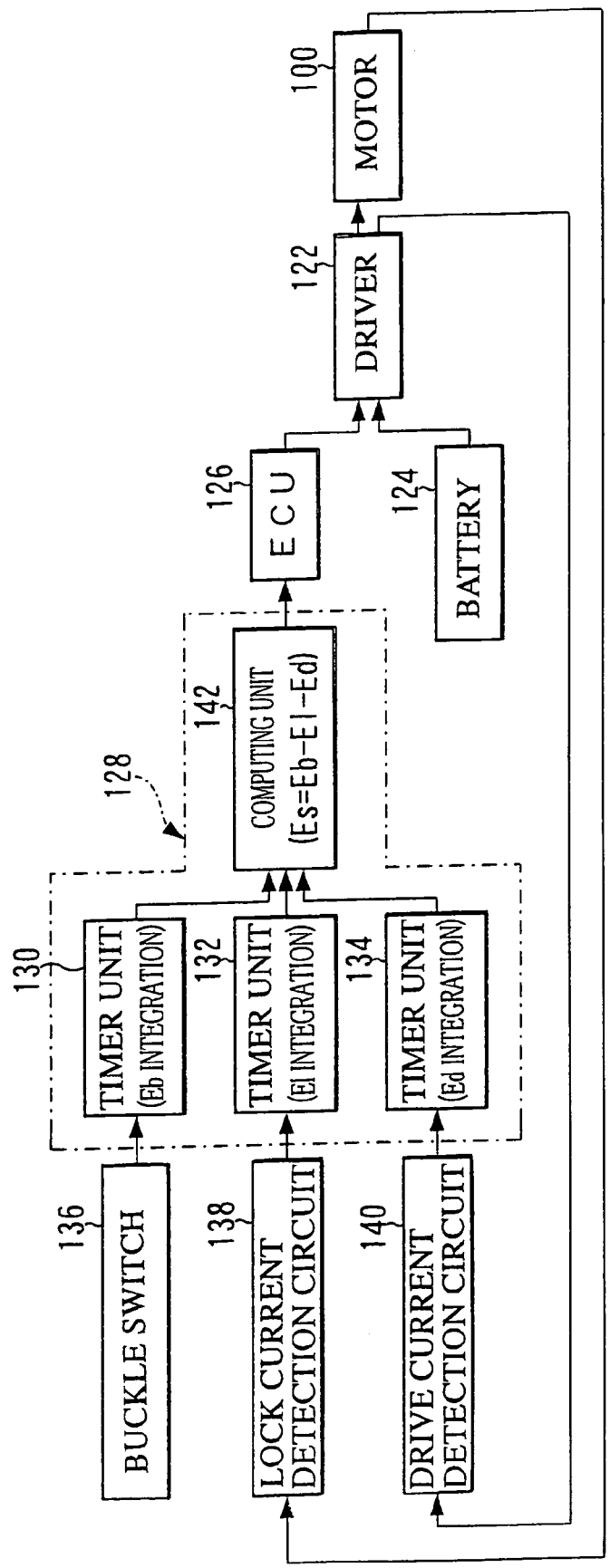
FIG. 3 is a control block diagram of drive means including computing means.

The ECU 126 is electrically connected to a computing circuit 128 serving as computing means. As shown in FIG. 3, the computing unit 128 is disposed with three timer units 130, 132 and 134. The timer unit 130 is electrically connected to a buckle switch 136.

The buckle switch 136 is disposed in the buckle device 46 shown in FIG. 2. In a state where the latch of the buckle device 46 is not engaged with the tongue plate 42, the buckle switch 126 outputs a low-level tongue detection signal Bs (the tongue detection signal Bs will be simply called a "signal Bs" below), and when the latch engages with the tongue plate 42, the buckle switch 136 outputs a high-level signal Bs.

When the signal Bs is inputted to the timer unit 130 and the signal Bs is switched from a high level to a low level, the value of a voltage Eb that the timer unit 130 outputs increases in accordance with the time after the switching (i.e., the time after the signal Bs is switched from a high level to a low level is integrated).

The timer unit 132 is electrically connected to the buckle switch 136 and a lock current detection circuit 138. The lock current detection circuit 138 configures a drive circuit of the motor 100. In a state where the motor 100 is powered and the output shaft 102 is rotating normally, a low-level lock current detection signal Ls (the lock current detection signal Ls will be simply called a "signal Ls" below) is outputted from the lock current detection circuit 138.

However, irrespective of the motor 100 being powered, when a lock current larger than the normal drive current flows to the drive circuit of the motor 100 as a result of the rotation of the output shaft 102 being stopped, a high-level signal Ls is outputted from the lock current detection circuit 138, and when the current value of the lock current reaches a constant value, the supply of electrical power to the motor 100 is cut off.

The value of a voltage El that the timer unit 132 outputs is reset as a result of the signal Bs being switched from a high level to a low level. When the signal Ls outputted from the lock current detection circuit 138 is switched from a low level to a high level, the value of the voltage El increases in accordance with the time after the switching (i.e., the time after the signal Ls is switched from a low level to a high level is integrated). When the signal Ls is switched from a high level to a low level, the timer unit 132 stops increasing the voltage El (i.e., the timer unit 132 stops the integration of time).

The timer unit 134 is electrically connected to the buckle switch 136 and a drive current detection circuit 140. The drive current detection circuit 140 configures the drive circuit of the motor 100 together with the lock current detection circuit 138. In a state where the motor 100 is not powered, a low level drive current detection signal Ds (the drive current detection signal Ds will be simply called a "signal Ds" below) is outputted from the drive current detection circuit 140. When the motor 100 is powered, a high-level signal Ds is outputted from the drive current detection circuit 140.

The value of a voltage Ed that the timer unit 134 outputs is reset as a result of the signal Bs being switched from a high level to a low level. When the signal Ds outputted from the drive current detection circuit 140 is switched from a high level to a low level, the value of the voltage Ed increases in accordance with the time after the switching (i.e., the time after the signal Ds is switched from a high level to a low level is integrated). When the signal Ds is switched from a low level to a high level, the timer unit 134 stops increasing the voltage Ed (i.e., the timer unit 134 stops the integration of time).

The timer units 130 to 134 are electrically connected to a computing unit 142, and the voltages Eb, El and Ed outputted from the timer units 130 to 134 are inputted to the computing unit 142. The computing unit 142 outputs a voltage Es of a size where the value of the voltage El and the value of the voltage Ed are subtracted from the value of the voltage Eb.

The computing unit 142 is electrically connected to the ECU 126. When the voltage Es outputted from the computing unit 142 reaches a predetermined value Es 1, the ECU 126 outputs a low level signal Cs.

Action and Effects of the Embodiment

Next, the action and effects of the present embodiment will be described by describing the operation of the webbing take-up device 10.

In the webbing take-up device 10, when the webbing belt 34 in the accommodated state where the webbing belt 34 is taken up in layers on the spool 32 is pulled while pulling the tongue plate 42, the webbing belt 34 taken up on the spool 32 is pulled out.

The webbing belt 34 pulled out in this manner is placed around the front of the body of the vehicle occupant seated in the seat 44, the tongue plate 42 is inserted into the buckle device 46, and the tongue plate 42 is retained in the buckle device 46, whereby the webbing belt 34 is fastened around the body of the vehicle occupant (referred to below simply as "the fastened state"). In this state, the high-level signal Bs is outputted from the buckle switch 136.

When the retention of the tongue plate 42 by the buckle device 46 is released and the tongue plate 42 comes out of the buckle device 46, the signal Bs outputted from the buckle switch 136 is switched from a high level to a low level, as indicated by the position of the elapse time T1 in the time chart of FIG. 4. As described above, the signal Bs is inputted to the timer unit 130, and when the signal Bs is switched from a high level to a low level, the timer unit 130 is actuated to gradually increase the output from the voltage Eb 0 (i.e., the integrated take-up time is integrated).

When the timer unit 130 is actuated and the voltage Eb larger than the voltage Eb 0 outputted from the timer unit 130 is inputted to the computing unit 142, the high level signal Cs is outputted from the ECU 126.

When the high level signal Cs outputted from the ECU 126 is inputted to the driver 122, the driver 122 powers and drives the motor 100. When the motor 100 begins driving and the output shaft 102 rotates, the rotation of the output shaft 102 is transmitted to the worm gear 116 via the gears 104 to 112 and causes the worm gear 116 to rotate.

The rotation of the worm gear 116 is transmitted to the worm wheel 94 meshing with the worm gear 116, and causes the worm wheel 94 of the clutch 92 to rotate in the take-up direction. The worm wheel 94 rotates in the take-up direction, whereby the pawl of the clutch 92 rotates and is coupled to the adapter, and the clutch 92 is coupled to the shaft portion 86 via the pawl and the adapter.

Thus, when the shaft portion 86 rotates in the take-up direction, the spool 32 coupled to the shaft portion 86 via the sleeve 82, the torsion shaft 48 and the lock base 54 rotates in the take-up direction. The spool 32 rotates in the take-up direction in this manner, whereby the webbing belt 34 is taken up on the spool 32 from the base end side.

Next, for example, when the vehicle occupant opens/closes the door panel of the vehicle 24 in this state and part of the webbing belt 34 becomes caught between the door panel and the peripheral edge of the door opening, the spool 32 takes up the webbing belt 34, whereby the tension applied to the webbing belt 34 does not extend to the webbing belt 34 at the end side closer to the front than the caught portion. Thus, in this state, the webbing belt 34 is taken up on the spool 32 at the end side closer to the base than the caught portion.

When the spool 32 rotates in the take-up direction and the webbing belt 34 is taken up in this state, the tension of the webbing belt 34 between the spool 32 and the caught portion between the door panel and the peripheral edge of the door opening exceeds the rotational force of the spool 32 in the take-up direction before the take-up amount of the webbing belt 34 on the spool 32 reaches a predetermined amount. Thus, the spool 32 stops.

When the spool 32 stops, the output shaft 102 of the motor 100 stops. Even in the state where the output shaft 102 is stopped, when electrical power is supplied to the motor 100, the drive current of the motor 100 increases over the normal current value, and a co-called lock current flows. When the lock current flows in this manner, the lock current is detected by the lock current detection circuit 138, and the signal Ls outputted from the lock current detection circuit 138 is switched from a low level to a high level, as indicated by the position of elapse time T2 in FIG. 4.

When the high-level signal Ls is inputted to the timer unit 132, the timer unit 132 is actuated to cause the output to gradually increase from the voltage El 0 (i.e., the lock current power time that is one example of the integrated stop time is integrated). Here, the voltages Eb, El and Ed are inputted to the computing unit 142, the values of the voltages El and Ed are subtracted from the value of the voltage Eb, and the voltage Es corresponding to the computing result is outputted from the computing unit 142.

As shown in FIG. 4, the increase of the voltage Eb is canceled by the increase of the voltage El. For this reason, in a state where the voltage El increases from the elapse time T2 on, the voltage Es outputted from the computing unit 142 does not increase.

Next, when the lock current increases and exceeds a predetermined value, the supply of electrical power to the motor 100 is stopped, and heating of the motor 100 and the like is prevented. In this state, the lock current does not flow because the drive current does not flow to the motor 100. Thus, in this state, the signal Ls is switched from a high level to a low level, as indicated by the position of elapse time T3 in FIG. 4, and the increase of the voltage El outputted from the timer unit 132 is stopped.

However, in this state, the signal Ds outputted from the drive current detection circuit 140 is switched from a high level to a low level because the drive current does not flow to the motor 100. When the signal Ls switched from a high level to a low level is inputted to the timer unit 134, the timer unit 134 is actuated to cause the output to gradually increase from the voltage Ed 0 (i.e., the power cutoff time that is one example of the integrated stop time is integrated).

Here, in this state, the voltage Ed increases even though the voltage El does not increase. For this reason, the increase of the voltage Eb is cancelled by the increase of the voltage Ed. For this reason, in a state where the voltage Ed increases from the elapse time T3 on, the voltage Es outputted from the computing unit 142 does not increase.

Next, the webbing belt 34 is removed from between the door panel and the peripheral edge of the door opening, and when the supply of electrical power to the motor 100 is resumed, as indicated by the position of the elapse time T4 in the time chart of FIG. 4, the signal Ds is switched from a low level to a high level, and the increase of the voltage Ed is stopped. Thus, the voltage Es increases in accompaniment with the increase of the voltage Eb from elapse time T4 on.

In this manner, the voltage Es increases in accompaniment with the increase of the voltage Eb, and when the current value of the voltage Es reaches Es 1 (i.e., when it reaches elapse time T5 in FIG. 4), the signal Cs outputted from the ECU 126 is switched from a high level to a low level. When the low-level signal Cs is inputted to the driver 122, the driver 122 cuts off the power to the motor 100 and causes the motor 100 to stop.

Here, as described above, the voltage Eb continues to increase from the point in time when the signal Bs from the buckle switch 136 becomes a low level, and basically the voltage Es outputted from the computing unit 142 also continues to increase in accompaniment with this, but the increase of the voltage Es is stopped in a state where the lock current detection circuit 138 is detecting the lock current and a state where the drive current detection circuit 140 has detected that the supply of the drive current to the motor 100 has been cut off. Namely, the increase of the voltage Es is stopped in a state where the rotation of the output shaft 102 is substantially stopped, and therefore a state where the taking-up of the webbing belt 34 by the spool 32 is stopped.

Thus, the time necessary until the voltage Es reaches Es 1 is the time in which the spool 32 is actually taking up the webbing belt 34. For this reason, the length of the webbing belt 34 to be taken up from when integration of the voltage Es begins to until the voltage Es reaches Es 1 becomes constant, regardless of the duration of the rotation stop time of the output shaft 102.

For this reason, the webbing belt 34 is taken up on the spool 32 until it is totally accommodated in the state where the voltage Es has reached Es 1, so that even if the rotation of the spool 32 is terminated while the spool 32 is in the middle of taking up the webbing belt 34, the spool 32 resumes taking up the webbing belt 32, so that the webbing belt 34 can be reliably taken up and accommodated until it is totally accommodated.

There is also a configuration where the rotation of the output shaft 102 and the gears 104 to 112, and the rotation of the shaft portion 86 and the spool 32, is detected by a rotary encoder, and whether or not the spool 32 has rotated until the webbing belt is totally accommodated is detected on the basis of this detection result. However, in this kind of configuration, the rotary encoder must be separately disposed, whereby the webbing take-up device 10 becomes large and heavy.

In contrast, in the present embodiment, the time in which the powering of the motor 100 is stopped is subtracted from the integrated time from the start of the powering of the motor 100. Thus, a configuration such as the aforementioned rotary encoder becomes unnecessary.

For this reason, increases in the overall size and weight of the webbing take-up device 10 can be prevented.

In the present embodiment, a configuration was described where the three timer units 130 to 134 were disposed and the voltages El and Ed were subtracted from the voltage Eb by the computing unit 142, but a configuration that obtains the same effects using a timer program offering the same action as that which was described above may also be used.

What is claimed is:

1. A webbing take-up device comprising:
   a spool to which a longitudinal-direction base end side of a long band-like webbing belt is attached, with the spool rotating in a take-up direction in regard to its axis, to thereby take up the webbing belt from the base end side around an outer peripheral portion of the spool from an unwound position into a re-wound position;
   drive means that is disposed with an output shaft, which causes the output shaft to rotate by outputting a drive force, transmits the rotation of the output shaft to the spool, and causes the spool to rotate in the take-up direction;
   computing means that integrates a take-up time after the drive force is outputted, integrates a stop time in which the rotation of the output shaft is stopped while integrating the take-up time, and computes the difference between the integrated take-up time and the integrated stop time; and
   control means that actuates the drive means in accompaniment with the release of a fastened state of the webbing belt with respect to the body of a vehicle occupant, and causes the drive means to stop on the basis of the fact that the difference between the integrated take-up time and the integrated stop time computed by the computing means has reached a predetermined time indicative of said webbing belt being in said re-wound around said spool,
   a lock current detection circuit that signals to the control means when a lock current flows to the drive means,
   wherein said control means de-actuates said drive means in response to said signal from said lock current detection circuit and re-actuates said drive means in response to a cessation of said signal such that said drive means is actuated until said difference reaches said predetermined time regardless of a duration of de-actuation of said drive means in response to said signal from said lock current detection circuit.

2. The webbing take-up device of claim 1, wherein the integrated stop time includes a lock current power time that is a time in which a lock current is flowing to the drive means and a power cutoff time that is a time in which the power to the drive means is cut off.

3. The webbing take-up device of claim 2, further comprising a buckle switch that outputs a signal representing the fastened state of the webbing belt to the vehicle occupant, wherein the computing means includes a first timer unit that starts the integration of the take-up time on the basis of the output of the buckle switch.

4. The webbing take-up device of claim 2, wherein the computing unit includes a second timer unit that starts the integration of the lock current power time on the basis of the output of the lock current detection circuit.

5. The webbing take-up device of claim 2, further comprising a drive current detection circuit that detects the flow of a drive current to the drive means, wherein the computing unit includes a third timer unit that starts the integration of the power cutoff time on the basis of the output of the drive current detection circuit.

6. A webbing take-up device comprising:
a spool including a peripheral surface that takes up a webbing belt from an unwound position into a re-wound position;
a drive motor that drives the spool, via a transmission mechanism, in a direction in which the spool takes up the webbing belt;
a computing unit that integrates a take-up time after the drive of the drive motor is started, integrates a stop time in which the rotation of the output shaft is stopped while integrating the take-up time, and computes the difference between the integrated take-up time and the integrated stop time; and
a control unit that starts the drive of the drive motor in response to the release of a fastened state of the webbing belt to the body of a vehicle occupant, and causes the drive motor to stop when the difference between the integrated take-up time and the integrated stop time computed by the computing means reaches a predetermined time indicative of said webbing belt being in said re-wound around said spool;
a lock current detection circuit that signals to the control unit when a lock current flows to the drive motor,
wherein said control unit de-actuates said drive motor in response to said signal from said lock current detection circuit and re-actuates said drive motor in response to a cessation of said signal such that said drive motor is actuated until said difference reaches said predetermined time regardless of a duration of de-actuation of said drive motor in response to said signal from said lock current detection circuit.

7. The webbing take-up device of claim 6, wherein the integrated stop time includes a lock current power time and a power cutoff time in which the power to the drive motor is cut off.

8. The webbing take-up device of claim 7, further comprising a lock current detection circuit that detects the flow of the lock current to the drive motor, wherein the computing unit includes a second timer unit that starts the integration of the lock current power time on the basis of the output of the lock current detection circuit.

9. The webbing take-up device of claim 7, further comprising a drive current detection circuit that detects the flow of a drive current to the drive motor, wherein the computing unit includes a third timer unit that integrates the power cutoff time on the basis of the output of the drive current detection circuit.

10. The webbing take-up device of claim 6, further comprising a buckle switch that outputs a signal representing the fastened state of the webbing belt to the vehicle occupant, wherein the computing unit includes a first timer unit that starts the integration of the take-up time on the basis of the output of the buckle switch.

11. A webbing take-up device comprising:
a spool including a peripheral surface that takes up a webbing belt from an unwound position into a re-wound position;
a drive motor that rotates the spool, via a transmission mechanism, in a direction in which the spool takes up the webbing belt; and
a control unit that controls the drive time of the motor,
a lock current detection circuit that signals to the control unit when a lock current flows to the drive motor,
wherein the control unit starts the drive of the drive motor in response to a release of the fastening of the webbing belt to a vehicle occupant, and terminates the taking up when a net take-up time in which the spool is taking up the webbing belt reaches a predetermined time indicative of said webbing belt being in said re-wound around said spool, and
wherein said control unit de-actuates said drive motor in response to said signal from said lock current detection circuit and re-actuates said drive motor in response to a cessation of said signal such that said drive motor is actuated until said difference reaches said predetermined time regardless of a duration of de-actuation of said drive motor in response to said signal from said lock current detection circuit.

12. The webbing take-up device of claim 11, wherein the integrated net take-up time is a time in which an integrated stop time in which an output shaft of the drive motor within the integrated take-up time is subtracted from an integrated take-up time elapsing after the drive motor starts driving.

13. The webbing take-up device of claim 11, wherein the integrated stop time includes a lock current power time and a power cutoff time in which the power to the drive motor is cut off.

14. A webbing take-up device comprising:
a spool to which a longitudinal-direction base end side of a long band-like webbing belt is attached, with the spool rotating in a take-up direction in regard to its axis, to thereby take up the webbing belt from the base end side around an outer peripheral portion of the spool from an unwound position into a re-wound position;
drive means that is disposed with an output shaft, which causes the output shaft to rotate by outputting a drive force, transmits the rotation of the output shaft to the spool, and causes the spool to rotate in the take-up direction;
computing means that integrates a take-up time after the drive force is outputted, integrates a stop time in which the rotation of the output shaft is stopped while integrating the take-up time, and computes the difference between the integrated take-up time and the integrated stop time; and
control means that actuates the drive means in accompaniment with the release of a fastened state of the webbing belt with respect to the body of a vehicle occupant, and causes the drive means to stop on the basis of the fact that the difference between the integrated take-up time and the integrated stop time computed by the computing means has reached a predetermined time indicative of said webbing belt being in said re-wound around said spool,
a tension detection circuit that signals to the control means due to a constant tension acting on the webbing belt, which obstructs the rotation of the spool in the take-up direction, wherein said control means de-actuates said drive means in response to said signal from said tension detection circuit and re-actuates said drive means in response to a cessation of said signal such that said drive means is actuated until said difference reaches said predetermined time regardless of a duration of de-actuation of said drive means in response to said signal from said tension detection circuit.

* * * * *